(12) United States Patent
Alho

(10) Patent No.: US 7,753,307 B2
(45) Date of Patent: Jul. 13, 2010

(54) WRAPPING DEVICE FOR FISHING RODS

(76) Inventor: Clyde R. Alho, 224 Mistwood La., North Aurora, IL (US) 60542

( * ) Notice: Subject to any disclaimer, the term of this patent is extended or adjusted under 35 U.S.C. 154(b) by 470 days.

(21) Appl. No.: 11/295,838

(22) Filed: Dec. 6, 2005

(65) Prior Publication Data

US 2007/0075175 A1    Apr. 5, 2007

Related U.S. Application Data

(60) Provisional application No. 60/633,616, filed on Dec. 6, 2004.

(51) Int. Cl.
*B21C 47/02* (2006.01)

(52) U.S. Cl. .................. 242/443; 242/445.1; 242/448; 29/433

(58) Field of Classification Search ........... 242/438, 242/443, 445.1, 446, 448; 29/428, 433, 779, 29/780, 782, 33 K, 564.6, 564.7
See application file for complete search history.

(56) References Cited

U.S. PATENT DOCUMENTS

| | | | | |
|---|---|---|---|---|
| 2,556,827 | A | * | 6/1951 | Striano ................. 242/447.3 |
| 2,564,016 | A | * | 8/1951 | Maddic ................. 242/441.2 |
| 2,609,155 | A | * | 9/1952 | Fosnaugh ............... 242/448.1 |
| 3,250,493 | A | * | 5/1966 | Golladay et al. ......... 242/437.1 |
| 4,279,684 | A | * | 7/1981 | Mason ................... 242/446 |
| 4,315,606 | A | * | 2/1982 | Seiders ................. 242/447.1 |
| 4,442,981 | A | * | 4/1984 | Cope ................... 242/448.1 |
| 5,314,565 | A | * | 5/1994 | Moore .................. 156/392 |
| D374,058 | S | * | 9/1996 | Lindquist, II ........... D22/134 |
| 5,649,675 | A | * | 7/1997 | Phelps ................. 242/441.2 |

OTHER PUBLICATIONS

Clemens 2001-2002 Rod Wrapping Catalogue, pp. 65-68.
Bach, Fred, Fred's Tension Jig, The RodCrafters Journal, Fall 2000, pp. 27-28, vol. 126, No. 4, RodCrafter Press, Allentown Pennsylvani.

(Continued)

*Primary Examiner*—Emmanuel M Marcelo
(74) *Attorney, Agent, or Firm*—Law Offices Mark A. Hamill, P.C.; Mark A. Hamill

(57) ABSTRACT

A wrapping device to wind thread onto elongated rod blanks of fishing poles to affix component parts therealong and for decorative purposes. The wrapping device includes a wrapping support saddle with a support base for placement on a support surface and a pair of support uprights movably mounted thereto in a spaced relationship to accommodate rod blanks of differing lengths. The support uprights have respective wrapping saddles to rotatably support the rod blanks without affixing to the wrapping device. The support uprights allow hands-free stopping of winding of the thread while under tension by securing the rod blanks to prevent unwrapping of the thread. The support uprights project forwardly toward a user to position the rod blanks in a comfortable wrapping position. A thread delivery system is movably mounted to the support base for dispensing and guiding the thread under a desired constant tension onto the rod blank. One or more constant tension springs engage the thread and deflect during winding so as to maintain the desired constant tension on the thread when winding is stopped. The wrapping device includes a steady rest for placement on the support surface which supports the rod blanks of longer lengths.

60 Claims, 3 Drawing Sheets

OTHER PUBLICATIONS

Figure 1:
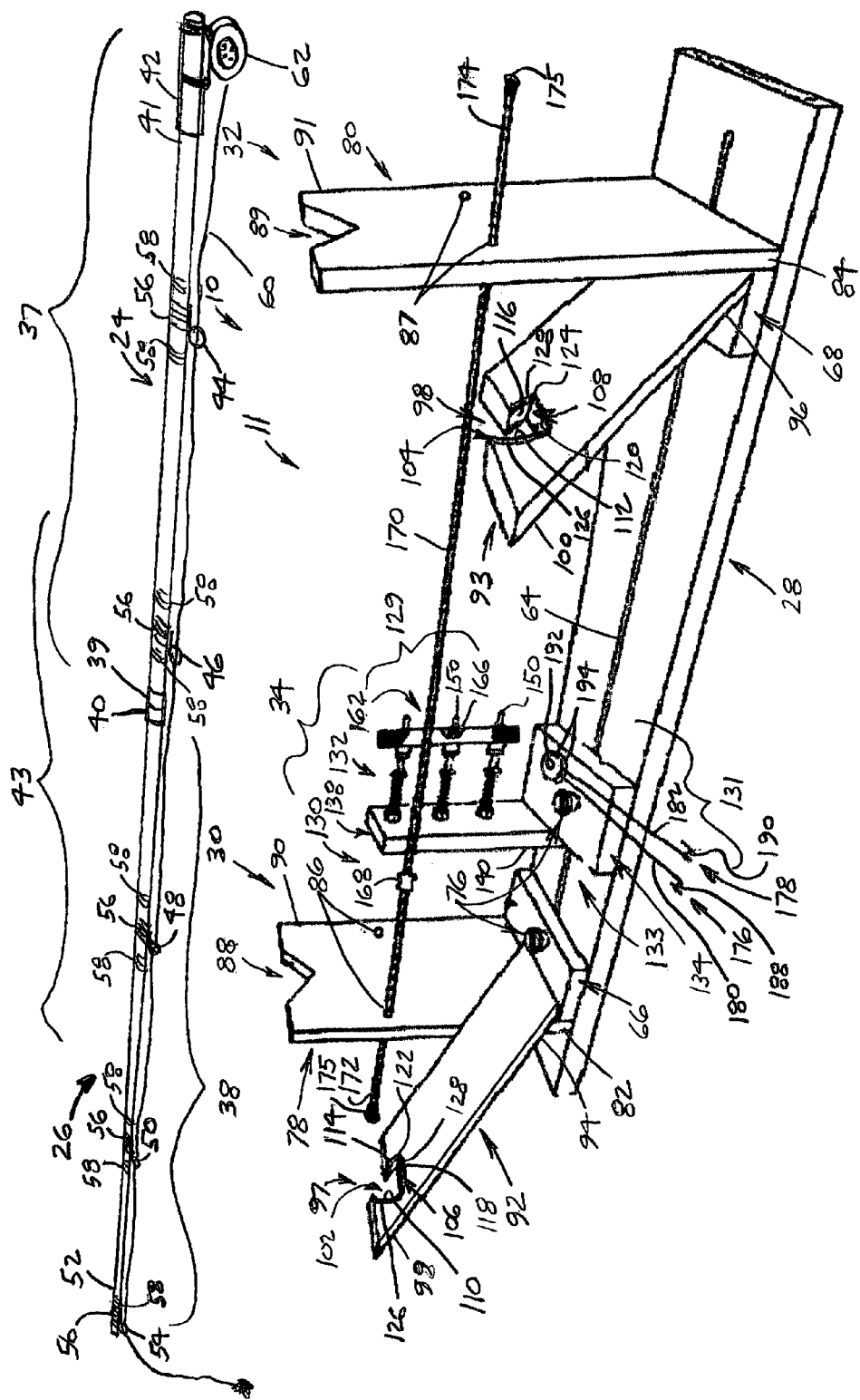

Johnson, Clay, The Tri-State Thread Jig, The RodCrafters Journal, Winter 1998, pp. 42-44, RodCrafter Press, Allentown Pennsylvania.
The Renzetti Complete Rod Lathe, Webpage URL http:/_www.renzetti.com_product.
The Renzetti Complete Rod Lathe, Webpage URL http:/_www.renzetti.com_product2.
The Sully Pro Wrapper, Webpage URL http:/_www.anglersworskshop.com_items.
The Sully Pro Wrapper, Webpage URL http:/_www.anglersworskshop.com_sully.

* cited by examiner

WRAPPING DEVICE FOR FISHING RODS

RELATED APPLICATION

This application claims priority of my copending U.S. Provisional Patent Application No. 60/633,616 filed Dec. 6, 2004, the entire disclosure of which is incorporated herein by reference thereto.

BACKGROUND OF THE INVENTION

1. Field

The present invention relates generally to winding/wrapping devices and methods for applying a continuous binding filament to items, and more particularly to wrapping devices for applying binding threads to secure fishing line guides and related pieces to rod blanks of fishing poles and methods of doing so.

2. State of the Art

Fisherman use various types of fishing rods such as salt water rods, bait casting rods, spinning rods, and fly rods. All of these fishing rods utilize silk or nylon threads to form spiral base wraps to retain fishing line guides and the like to an elongated rod blank which along with a gripping handle glued thereto form a completed fishing pole. Decorative wraps of colored thread are often applied for color contrast with the base wrap. For example, thread of one color used for a middle base wrap and a thread of another contrasting color used for a pair of decorative wraps adjoining opposite edges of the base wrap. A conventional reel with fishing line mounts to the fishing pole at the gripping handle. Some fisherman, particularly those who do fly fishing, re-wrap their fishing rods on a periodic basis such as annually as a hobby or to prevent deterioration due to repeated water soakings during seasonal use.

Fishing rods are often made using several shorter section blanks rather than the elongated rod blank. The sections slip-fit together using respective interlocking connectors at their ends to form the full length of the fishing pole. Such fishing rods of sectional construction then break down to a more compact size for transport in a matching storage case.

The rod blank or sections are made of the latest carbon fiber (graphite), the older fiberglass, or the traditional strips of bamboo which are joined together to form a flexible section of solid or hollowed tubular construction. Some fly fisherman still prefer the traditional bamboo fly rods despite modern advances in materials.

Manufacture of rod or section blanks of fishing poles from carbon fiber (graphite) and fiberglass is relatively quick using automated fixed molding, extrusion, or pultrusion processes for producing solid rods and section blanks and other suitable processes for producing hollowed tubular rods and section blanks. Manufacturing of the rod or section blanks from bamboo is more hand-labor intensive. The bamboo rod and section blanks are made using about six of the bamboo strips which are formed by splitting a stalk of bamboo and beveling opposite lateral edges. The bamboo strips are joined together to form the tubular or solid construction, depending on the diameter of the rod or section blank, by gluing together the lateral edges of the bamboo strips. The rod or section blank is then reinforced by binding together the bamboo strips using a plurality of base wraps of thread at spaced intervals along the length thereof. Exposed bamboo and wraps are then waterproofed using the older spar varnishes, the newer polyurethane varnishes, or other waterproofing material to keep water from soaking into the fishing rod and causing damage. Exposed wraps of carbon fiber rod and section blanks are typically finished with a two-part epoxy.

There are many winding or wrapping devices (hereinafter all referred to as wrapping devices) designed to aid in the wrapping of rod blanks to make fishing poles. Manufacturers typically utilize powered wrapping devices for higher production volume. Fisherman often utilize what they can make or purchase an inexpensive hand-wrapping device to make or repair their fishing rods.

Various wrapping devices for wrapping rod blanks and repairing fishing rods have been patented over the years. For example, in U.S. Pat. No. 2,430,892 issued to Tirrell on Nov. 18, 1947 is disclosed a rod wrapping device which includes a tubular holder of square cross-section. A pair of clamps are mounted to adjacent ends of the rod holder to hold a rod blank for manual rotation in the rod holder. The rod holder has a hole that receives a friction member which can be forced against the rod blank using bow spring in response to the positioning of a slide member to lock the rod blank from rotation. A thread tensioning member is mounted at one end of the rod holder extending from a longitudinal axis of the rod holder which terminates in one or more arms each supporting a spool of thread on a bolt. Each thread spool is frictionally engaged by a compression spring to provide variable thread tension using a lock nut threaded onto the bolt as the thread is wound onto the rod blank. A laterally projecting plate on each arm overhangs respective of the spools each with one or more slits through which the respective thread from the spools is reeved. When the wrapping device is used, a guide member is attached to rod blank which comprises a slotted cylindrical spring to admit two bar members. Respective upper ends of the bar members function as finger grips. One bar member has a winged extension and the other bar member has a resilient cover at respective lower ends. The cover facilitates clamping against the rod blank.

In U.S. Pat. No. 2,475,305 issued to Baker on Jul. 5, 1949 is disclosed an apparatus for wrapping fishing rods which includes a supporting base with respective rod holding members slidably mounted thereon using dovetailed slides that engage grooves in an upper side of the supporting base. This allows longitudinal adjustment of the rod holding members. The rod holding members have respective V-shaped recesses with respective opposing flat horizontal and inclined rod engaging surfaces which extend outwardly from respective apexes of the recesses. The rod engaging surfaces are provided with respective linings made of cork or other suitable material affixed thereto having resilient and friction gripping qualities and which will not mar the rod blank. The recesses grip rod blanks of various diameters. Respective upper and lower rods are provided for holding spools of thread that are mounted behind the rod supports on a support rack comprised of a base member and a pair of vertically extending end members affixed to opposite ends of the base member. The upper rod supports a plurality of spools and provides thread tension using a spring washer and a pair of adjusting nuts threaded onto an externally threaded part thereof. The lower rod supports a plurality of the spools and provides thread tension using a compression spring an adjusting nut threaded onto an externally threaded part thereof. The upper and lower rods are mounted in bearings affixed to the end members and may be longitudinally moved so any of the spools having a desired kind and colors of thread may be positioned mid-way between the rod holding members and fixedly secured to one of the end members for wrapping the rod blank.

In U.S. Pat. No. 2,609,155 issued to Fosnaugh on Sep. 2, 1952 is disclosed a fishing rod wrapping device which includes a pair of support members each having an angled leg, a vertical leg, and a pair of feet mounted on a base. The support members each have a sloping rest support surface with formed semi-circular bearing areas to receive the rod blank. A resilient clamp member is mounted to each support member at the support surface to retain the rod blank within the bearing areas of the support members. The clamp members also provide frictional resistance to rotation of the rod blank to prevent accidental rotation thereof. A guide rod is retained within another formed semi-circular bearing area with respective bent ends to receive respective thread spools. A resilient thread tensioning member is retained under a frontmost foot of each support member having an upwardly bowed portion that engages respective of the spools to provide thread tension and to retain the spools to the bent ends of the rod. A rod positioning member includes a body made of spring sheet metal of generally U-shape slidably disposed along the guide rod. The body has a base leg slidably disposed against the base and a pair of angular arms having respective guide holes to slidably receive the guide rod when the arms are slightly squeezed together and lock when not squeezed together. Respective thread guide holes, one for each spools, are disposed on the ends of the guide rod which provide final guiding for the threads used in wrapping the rod blank. A support wire has a lower end affixed to the base leg and a hooked upper end to support the rod blank at a wrapping area of the rod blank.

In U.S. Pat. No. Des. 374,058 issued to Lindquist, II on Sep. 24, 1996 is disclosed an ornamental design for a fishing rod wrapping tool base. The drawings show a T-shaped base having a center member slidably connected to a cross member with an upstanding dovetail using a clamping device. A pair of rod supports each have a dovetail recesses at respective lower ends thereof which engage the dovetail of the cross member. This arrangement provides longitudinal adjustment of the center member and the rod supports along the base. The rod supports each have an upper end with a V-groove and a sheet of material affixed thereto. A resilient cord extends from respective apexes of the V-grooves. A rod blank placed in the V-grooves is evidently retained in the V-grooves by looping the cords over the rod blank and through respective slots of the rod supports and securing the cords to respective fasteners provided below the slots.

While the prior art wrapping devices are generally adequate for the purposes intended, they have numerous shortcomings. Firstly, they are cumbersome and are not easily used to do wrapping, and most do not have provisions to lock the rod blank to prevent unwrapping of the thread between winding operations or have burdensome manually-operated fastening down. Secondly, most do not have provisions for smooth adjustable thread spool tensioning. Thirdly, most do not have provisions for performing spiral and simple cross wraps. Fourthly, most do not allows wrapping at a comfortable position and height for steady thread application. Fifthly, many do not have rod supports that are adjustable to position the line guides for wrapping. Sixthly, most do not have provisions to allow wrapping of any length fishing rod. Seventhly, none have a three thread spool capacity to allow three thread wrapping. Eighthly, most do not allow wrapping without affixing the rod blank to the wrapping device. Finally, none conveniently allow both left- and right-hand operation.

There is a need for an improved wrapping device for fishing rods and method of use. Improvements include: 1) has a unique rod holding saddle that enables an operator to do wrapping with ease and locks the rod blank to prevent unwrapping of the thread between winding operations without manually fastening it down; 2) allows smooth adjustable thread spool tension; 3) has an adjustable thread carriage for spiral and simple cross wraps; 4) allows wrapping at a comfortable position and height for steady thread application; 5) has rod supports that are adjustable to position the line guides for wrapping; 6) allows wrapping of any length and diameter fishing rod as well as tips with ease; 7) has a three thread spool capacity; 8) allows wrapping without affixing the rod blank to the wrapping device; and 9) allows left- and right-hand operation.

SUMMARY OF THE INVENTION

The present invention is a wrapping device for placement on an elevated support surface to wind threads dispensed from thread spools onto elongated rod blanks of fishing poles to affix component parts therealong and for decorative purposes and a method of winding.

The wrapping device comprises a wrapping support saddle which includes a support base for placement on the support surface. A pair of rod finishing support uprights are mounted to the support base in a longitudinally spaced relationship adapted to rotationally support the rod blanks. A thread delivery system is mounted to the support base adapted for dispensing and guiding the thread under a desired tension onto the rod blanks as gripped in-hand and rotated during a winding operation.

In a preferred wrapping device, one or more of the rod finishing support uprights have respective rod wrapping saddles to receive and rotationally support the rod blanks during thread winding. One or more of the rod finishing support uprights is adapted to automatically grip the rod blank when partially and completely released from gripping in-hand respectively for braking and to prevent unwrapping of the thread. The thread delivery system includes a thread support assembly mounted to the support base adapted for dispensing the threads under the desired tension and one or more of a guide pulley assembly and a thread guide spring assembly mounted to the support base each adapted for guiding the threads from the thread support assembly onto the rod blank. The thread support assembly includes one or more spool tensioning devices adapted to receive the thread spool to dispense the thread under the desired tension and provide adjustment of thread tension affixed to a thread support base mounted to the support base. The thread guide spring assembly includes one or more constant tension springs affixed to the thread support assembly adapted to flex during winding to maintain the desired tension on the thread when winding and when winding is stopped.

The method of winding comprises the steps of: 1) providing a wrapping device that includes a wrapping support saddle for rotationally supporting the rod blanks and a thread delivery system for receiving the thread spools, dispensing, and guiding the thread under a desired constant tension onto the rod blanks when winding and when winding is stopped; 2) placing the rod blank onto the support saddle; 3) securing a starting end of the thread to the rod blank; 4) winding and guiding the thread onto the rod blank at the desired constant tension; 5) securing a finishing end of the thread to the rod blank; and 6) removing the rod blank from the support saddle.

In a preferred method, the wrapping device; 1) automatically grips the rod blank when partially and completely released from gripping in-hand respectively for braking and to prevent unwrapping of the thread; 2) includes at least one constant tension spring that flexes during winding to maintain the desired tension on the thread when winding and when winding is stopped; 3) provides adjustment of thread tension to the desired tension; 4) includes a support base and a pair of rod finishing support uprights mounted thereto in a movable manner of longitudinally therealong and pivotally; 5) includes a separate steady rest to rotationally support the rod blank; and 6) includes a guide pulley rotatably and slideably mounted thereto for guiding the threads from the thread support assembly onto the rod blank.

The method includes a step of longitudinally adjusting at least one of the rod finishing support uprights to accommodate the length of the rod blank and pivotally adjusting at least one thereof for a purpose chosen from the group consisting of to move out of the way and to convert the rod wrapping device to opposite-handed operation. The step of placing the rod blank onto the support saddle includes positioning the steady rest and placing the rod blank thereon to supplement supporting capabilities of the wrapping support saddle during wrapping of long rod blanks. The method includes a step of adjusting the thread tension to the desired thread tension. The step of winding and guiding the thread onto the rod blank is done by rotating the rod blank by hand and guiding the thread using the guide pulley. The method includes at least one step of partially releasing the rod blank to slow rotation thereof or completely releasing the rod blank to stop rotation thereof. The method includes a step of allowing slight unwinding of the thread from the rod blank to correct a winding mistake while maintaining the desired thread tension.

THE DRAWINGS

Figure 2:
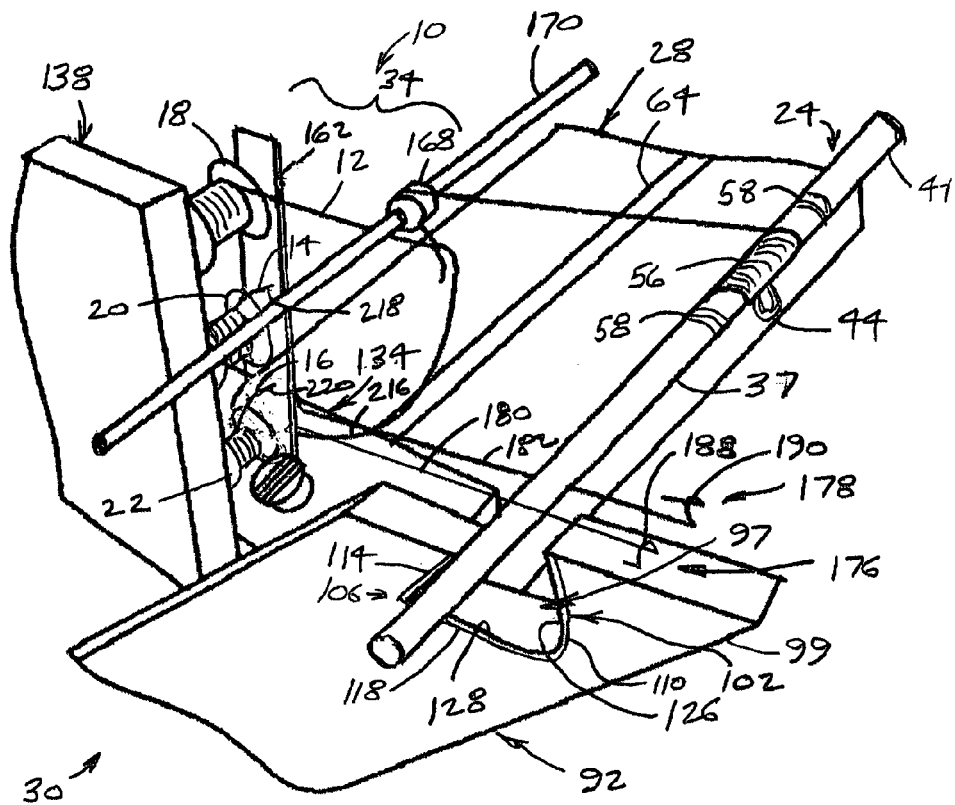
Figure 4:
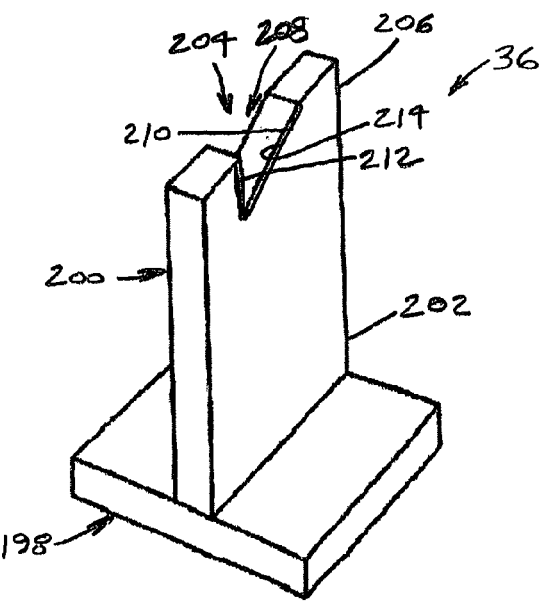
Figure 3:
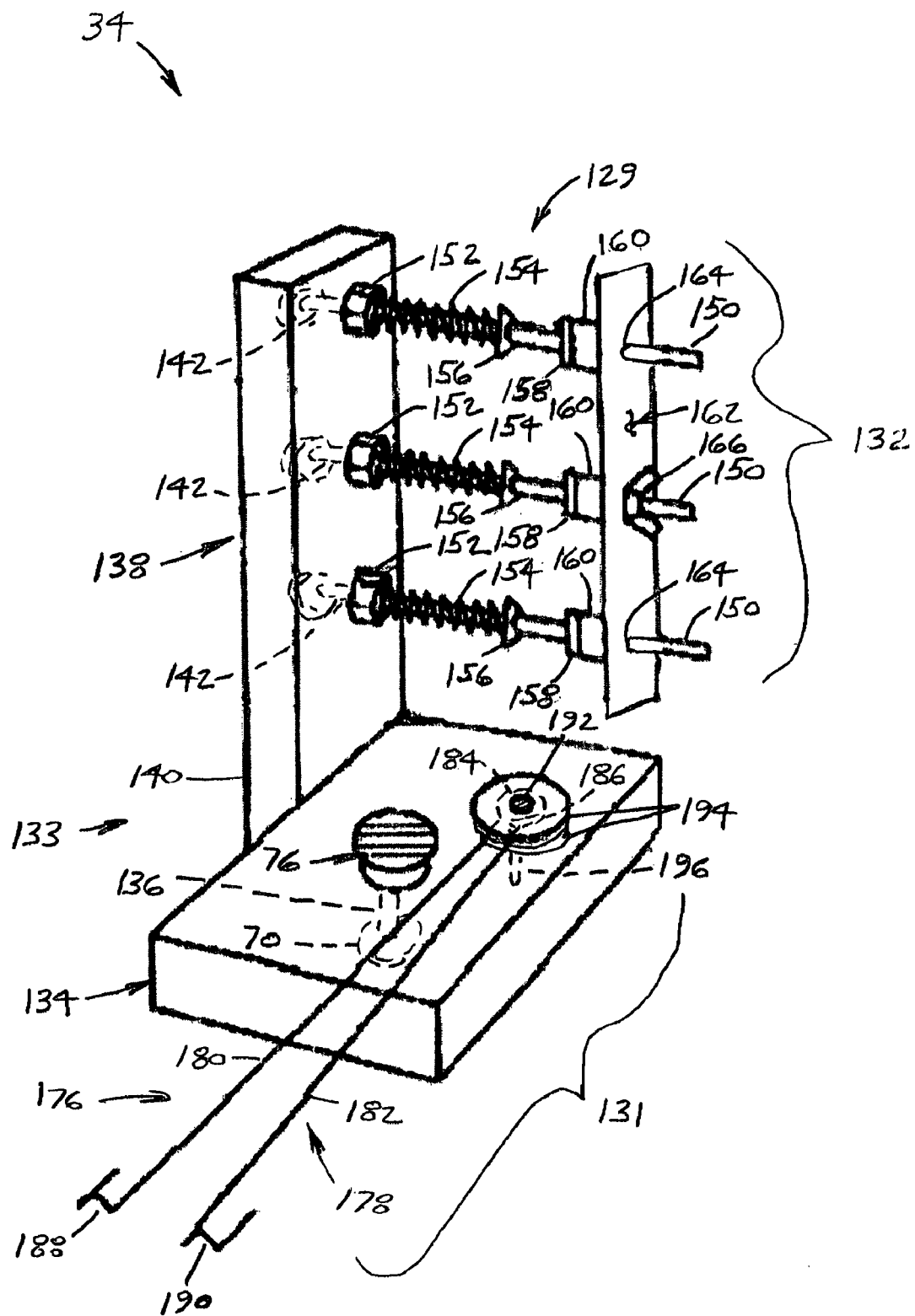

The best mode presently contemplated for carrying out the invention is illustrated in the accompanying drawings, in which:

FIG. 1 is a perspective view of a wrapping support saddle in accordance with the present invention for wrapping a plurality of threads dispensed from conventional thread spools around an elongated rod blank of a conventional fishing rod, the support saddle including a support base, a pair of left and right rod finishing support uprights movably mounted thereto, a thread delivery system for dispensing and guiding the threads under a desired tension onto the rod blank, and a steady rest used as an aid for wrapping very long rod blanks, fishing rods with handles, and a top guide of the fishing rod;

FIG. 2, a fragmentary perspective view of the wrapping support saddle to an enlarged scale showing the support base, the rod blank supported on the left rod finishing support upright, the thread spools with threads mounted on a thread support assembly of the thread delivery system for dispensing the threads under the desired tension, a guide pulley assembly of the thread delivery system for guiding the threads onto the rod blank, and a thread guide spring assembly of the thread delivery system for supplemental guiding of the threads onto the rod blank;

FIG. 3, a perspective view of the thread support assembly which includes a constant tension assembly mounted to a thread support upright; and FIG. 4, a perspective view of the steady rest to the enlarged scale.

DETAILED DESCRIPTION OF THE ILLUSTRATED EMBODIMENTS

Referring to FIG. 1, therein is shown a wrapping device for fishing rods in accordance with the present invention, designated generally at 10. The wrapping device 10 includes a wrapping support saddle 11 for wrapping respective first, second, and third threads 12, 14, and 16 (FIG. 2) dispensed from conventional thread spools 18, 20, and 22 thereof around an elongated rod blank 24 of a conventional fishing rod 26. The wrapping support saddle 11 includes a support base 28, a pair of left and right rod finishing support uprights 30 and 32 movably mounted thereto, and a thread delivery system 34 for dispensing and guiding the threads 12, 14, and 16 under a desired tension onto the rod blank 24. The wrapping device 10 further includes a steady rest 36 (FIG. 4) that may be used for steadying long fishing rods 26. The wrapping support saddle 11 is primarily made from wood which is preferably stained, varnished, or otherwise coated. Plastics or other suitable materials may also be used.

The completed fishing rod 26 includes the rod blank 24 typically made of carbon fiber or fiberglass in a pair of sections 37 and 38 interconnected at a pair of connectors 39 and 40. The fishing rod 26 has a butt end 41 around which a gripping handle 42 is affixed, a middle 43 with a plurality of line guides 44, 46, 48, and 50 affixed therealong, and a tip 52 with a tip guide 54 affixed thereto. The line guides 44, 46, 48, and 50, and the tip guide 54 are typically formed from coated stainless steel and are affixed along the rod blank 24 using a plurality of base wraps 56 of one of the first, second, and third threads 12, 14, and 16 and one or more optional decorative trim wraps 58 of another of the first, second, and third threads 12, 14, and 16 of a desired decorative color to guide fishing line 60 extending from a reel 62 of the fishing rod 26.

The support base 28 is of rectangular shape which provides a solid structure upon to which to mount the left and right rod finishing support uprights 30 and 32, and the thread delivery system 34. The support base 28 has a longitudinal adjustment slot 64 to allow longitudinal adjustment of the support uprights 30 and 32 and the thread delivery system 34 to suit the particular wrapping operation being conducted and the particular design of the fishing rod 26 including rod blanks and sections 24, 37, and 38 of differing lengths and to avoid placement of previously wrapped line guides 44, 46, 48, or 50 on the wrapping support saddle 11.

The left and right rod finishing support uprights 30 and 32 include respective left and right base members 66 and 68 each of rectangular shape adjustability attached along the support base 28 using respective carriage bolts 70 that extend upwardly through the adjustment slot 64 of the support base 28 and through respective holes 72 and 74 of the left and right base members 66 and 68 secured using respective mating thumb screws 76. Alternatively, thumb screws (not shown) may be used that have a gripping portion and a downwardly dependent threaded rod that extends through the adjustment slot 64 and threads into a threaded tee nut brad hole connector (not shown). Respective left and right upright members 78 and 80 each of rectangular shape have respective lower ends 82 and 84 affixed to respective of the left and right base members 66 and 68 and extend upwardly therefrom at respective right angles. Respective tensioning holes 86 and 87 extend through the left and right upright members 78 and 80.

The left and right upright members 78 and 80 have respective left and right support areas or V-grooves 88 and 89 cut in respective upper ends 90 and 91 thereof defined by respective pairs of flat planar angled surfaces 92 and 93, and 94 and 95. The angled surfaces 92 and 93 of the V-groove 88 and the angled surfaces 94 and 95 of the V-groove 89 are covered with respective support sheets 96 affixed thereto. The support sheets 96 are made of a non-abrasive slick material, preferably felt sheet material, that allows free rotation and protects the rod blank 24 during protective finish application and curing operations. The left and right rod V-grooves 88 and 89 support the rod blank 24 centered over the support base 28 for attachment to a conventional finishing motor (not shown) to rotate the rod blank 24 during application and curing of a protective finish (not shown) to keep water from soaking into the fishing rod 26 and causing damage to the base and trim wraps 56 and 58, and between winding operations.

Respective left and right rod wrapping support arms 97 and 98 of the left and right rod finishing support uprights 30 and 32 each of parallelogram shape have respective lower ends 99 and 100 affixed to respective of the left and right rod finishing support uprights 78 and 80 and extend forwardly therefrom (laterally of the support base 28) towards an operator (not shown) of the wrapping support saddle 11 disposed at an angle of about forty-five degrees from vertical.

The left and right rod wrapping support arms 97 and 98 have respective left and right rod wrapping saddles 101 and 102 cut in respective upper ends 103 and 104 thereof. The left and right rod wrapping saddles 101 and 102 have respective left and right wrapping areas 104 and 105 and respective left and right gripping areas 106 and 108. The left and right wrapping areas 103 and 105 are defined by respective curved planar left and right wrapping surfaces 110 and 112. The left and right gripping areas 106 and 108 are defined by respective flat planar left and right upper gripping surfaces 114 and 116, and by respective flat planar left and right lower gripping surfaces 118 and 120 that join at respective apex lines 122 and 124.

The left and right wrapping surfaces 110 and 112 of the wrapping areas 103 and 105 are covered with respective wrapping sheets 126 affixed thereto. The wrapping sheets 126 are made of the non-abrasive slick material, preferably the felt sheet material, that allows free rotation and protects the rod blank 24 during wrapping operations.

The upper and lower gripping surfaces 114 and 118 of the left gripping area 106 and the upper and lower gripping surfaces 116 and 120 of the right gripping area 108 are covered with respective gripping sheets 128 affixed thereto. The gripping sheets 128 are made of a non-abrasive gripping material, preferably open cell sponge rubber sheet material, that compresses to provide tension locking or braking action against thread tension of the first, second, or third threads 12, 14, and 16 applied during wrapping of the rod blank 24 as the thread delivery system 34 dispenses the threads 12, 14, and 16 under the desired tension.

The thread delivery system 34 includes a thread support assembly 129 for dispensing the threads 12, 14, and 16 under the desired tension, a guide pulley assembly 130 for guiding the threads 12, 14, and 16 onto the rod blank 24, and a thread guide spring assembly 131 for supplemental guiding of the threads 12, 14, and 16 onto the rod blank 24.

The thread support assembly 129 includes a spool tensioning assembly 132 mounted to a thread support upright 133. The thread support assembly 129 is mounted to the support base 28 between the left and right rod finishing support uprights 30 and 32.

The thread support upright 133 includes a base member 134 of rectangular shape adjustability attached along the support base 28 using another carriage bolt 70 that extends upwardly through the adjustment slot 64 of the support base 28 and through a hole 136 of the base member 134 secured using another thumb screw 76. An upright member 138 of rectangular shape has a lower end 140 affixed to the base member 134 and extends upwardly therefrom at a right angle. A plurality of mounting holes 142 are linearly disposed through the upright member 138.

The spool tensioning assembly 132 includes a plurality of bolts in the form of thread spool spindles 150 which extend through respective of the mounting holes 142 of the upright member 138 secured thereto using respective hexagonal nuts 152. A plurality of compression springs in the form of thread spool springs 154 are disposed about respective of the thread spool spindles 150. A plurality of flat washers in the form of thread spool inner and outer washers 156 and 158, and a plurality of short tubes in the form of thread spool spacers 160 are disposed about respective of the thread spool spindles 150. The inner and outer washers 156 and 158, and the thread spool spacers 160 are preferably made of nylon or similar plastic materials. The thread spools 18, 20, and 22 holding the first, second, and third threads 12, 14, and 16 are rotatably mounted to respective of the thread spool spindles 150 between respective of the thread spool inner washers 156 and the thread spool outer washers 158. A tension plate 162 of rectangular shape has a plurality of holes 164 linearly disposed therethrough to receive respective of the thread spool spindles 150 which correspond with the mounting holes 142 of the upright member 138. A tensioning wing nut 166 is threaded onto a middlemost of the thread spool spindles 150 which is used to provide even, adjustable pressure against the thread spool spacers 160, which in turn apply pressure against the thread spool outer washers 158, the thread spools 18, 20, and 22, and the thread spool inner washers 156 to compress the thread spool springs 154 against the hexagonal nuts 152 resulting in even thread tension coming off all the thread spool spindles 150.

The guide pulley assembly 130 includes a guide pulley 168 rotatably and slideably mounted on the support base 28 on an elongated shaft 170. Opposite ends 172 and 174 of the shaft 170 extend through respective of the tensioning holes 86 and 87 of the left and right rod finishing support uprights 30 and 32. A pair of end caps 175 tightly press-fit onto respective of the ends 172 and 174 to retain the shaft 170 to the left and right rod finishing support uprights 30 and 32.

The thread guide spring assembly 131 includes respective left and right constant tension springs 176 and 178 having respective elongated bodies 180 and 182, respective horizontally looped proximal ends 184 and 186, and respective thread receiving distal ends 188 and 190 of vertically disposed inverted U-shape. The left and right constant tension springs 176 and 178 are mounted to the base member 134 of the thread support upright 133 using a screw 192 that extends through a pair of flat washers 194 with the proximal ends 184 and 186 disposed therebetween, and engages a threaded hole 196 of the base member 134. The left and right tension springs 176 and 178 are made of spring wire and function to maintain constant thread tension on the threads 12, 14, and 16 both while the rod blank 24 is being rotated during the wrapping operation and when stationary.

For certain thread wrapping operations, one or both of the constant tension springs 176 and 178 can also be simultaneously engaged by one or more of the first, second, and third threads 12, 14, and 16 from the thread guide spring assembly 131. One of the first, second, and third threads 12, 14, and 16 feeds over the guide pulley 168 onto the rod blank 24 mounted in the rod wrapping saddles 101 and 102 of the left and right rod finishing support uprights 30 and 32. Other of the first, second, and third threads 12, 14, and 16 engages the thread receiving distal ends 188 and 190 of the constant tension springs 176 or 178 and travel directly to the rod blank 24.

The steady rest 36 includes a base member 198 and an upright member 200 each of rectangular shape. The upright member 200 has a lower end 202 affixed to the base member 198 and extends upwardly therefrom at a right angle. The upright member 200 has a support area or V-groove 204 cut in an upper end 206 defined by a flat planar vertical surface 210 and a flat planar angled surface 212. The vertical and angled surfaces 210 and 212 of the V-groove 204 are covered with a support sheet 214 affixed thereto. The support sheet 214 is made of the non-abrasive slick material, preferably the felt sheet material, that allows free rotation and protects the rod blank 24 during wrapping operations. The steady rest 36 supplements the rod blank supporting capabilities of the left and right rod finishing support uprights 30 and 32 such as during wrapping a fishing rod 28 having the gripping handle 40, wrapping a very long rod blank 24, and wrapping the tip guide 54 of the fishing rod 26.

Prior to starting the wrapping operation, an operator loads the thread spindles 150 of the thread delivery system 34 with one, two, or three of the thread spools 18, 20, and 22 of the first, second, and third threads 12, 14, and 16. This is done by: 1) removing the wing nut 166 and the tension plate 162 from the thread spool spindles 150; 2) removing a number of the thread spool spacers 160 and the outer thread spool washers 158 from the thread spindles 150 corresponding to a desired number of thread spools 18, 20, and 22 to be used; 3) mounting the desired number of thread spools 18, 20, and 22 on respective of the spindles 150; 4) replacing the removed outer thread spool washers 158 and thread spool spacers 160 on the thread spindles 150; 5) replacing the removed tension plate 162 and the wing nut 166 on the thread spool spindles 150 and re-tightening the wing nut 166 to provide the desired thread tension.

The operator prepares for the wrapping operation by: 6) placing the rod blank 24 into the left and right rod wrapping saddles 101 and 102 of the left and right rod finishing support uprights 30 and 32; 7) adjusting one or both of the rod finishing support uprights 30 and 32 if necessary to fit the rod blank 24 along the support base 28 to suit the rod blank 24 to be wrapped by loosening the associated thumb screw 76, sliding the rod finishing support upright 30 and/or 32 along the slot 64, and re-tightening the associated thumb screw 76; 8) grabbing a free end 216, 218, or 220 of one of the first, second, and third threads 12, 14, and 16 and pulling it to unwind the first, second, or third thread 12, 14, and 16 from an associated of the thread spools 18, 20, or 22 over the top of the guide pulley 168; 9) hooking the one of the first, second, and third threads 12, 14, and 16 to the distal end 188 of the left constant tension spring 176 (for wrapping from the operator's right to left); 10) pulling the free end 216, 218, or 220 so the left constant tension spring 176 deflects upwardly towards the guide pulley 168 to provide constant thread tension and simultaneously adjusting the spool tension by tightening or loosening the wing nut 166 until the left constant tension spring 176 is under a desired thread tension with the distal end 188 under the guide pulley 168; 11) pulling the free end 216, 218, or 220 of the one of the first, second, and third threads 12, 14, and 16 from over the top of the guide pulley 168 over the top of the rod blank 24.

The operator makes the base wrap 56 by: 12) manually rotating the rod blank 24 on the wrapping sheets 126 in the wrapping areas 104 and 105 of the left and right rod wrapping saddles 101 and 102. The operator may interrupt the wrapping operation by: 13) moving the rod blank 24 against the gripping sheets 128 in the gripping areas 106 and 108 of the left and right rod wrapping saddles 101 and 102. Thread tension is applied to the one of the first, second, or third threads 12, 14, and 16 by the left constant tension spring 176 which pulls and retains the rod blank 24 against the gripping sheets 128 which compress and hold the rod blank 24 at the apex lines 122 and 124. The operator can also back wrap a few turns under constant tension to correct mistakes.

The operator can make tip wraps by: 14) placing the steady rest 36 on either the left or right side of the support base 28 with the angled surface 212 away from the operator towards the rear; 15) placing the butt end 41 of the fishing rod 26 into the V-groove 204 of the steady rest 36 resting on the support sheet 214 and placing the tip 52 into one of the left and right rod wrapping saddles 101 and 102 of the left and right rod finishing support uprights 30 and 32. The operator may interrupt the wrapping operation by: 16) moving the rod blank 24 against the gripping sheets 128 in the gripping areas 106 and 108 of the left or right rod wrapping saddles 101 and 102 being used with the butt end 41 resting against the support sheet 214 at the angled surface 212.

The operator can wrap long fishing rods 28 by: 17) removing the end cap 175 from one end 172 or 174 of the shaft 170; 18) pulling the one end 172 or 174 from the tensioning hole 86 or 87 of the associated left or right rod finishing support upright 30 and 32; 19) loosening the thumb screw 76 and rotating the left or right rod finishing support upright 30 and 32 so the associated left or right rod wrapping support arm 97 or 98 is towards the rear away from the operator; 20) inserting the one end 172 or 174 of the shaft 170 through the other of the tensioning holes 86 or 87 from which the one end 172 or 174 was removed; and 21) replacing the end cap 175 on the one end 172 or 174 from which it was removed. The steady rest 36 and the left or right rod wrapping support arm 97 or 98 of the one of left and right rod finishing support uprights 30 and 32 not rotated are used to support the rod blank 24 for wrapping.

The operator can add the decorative trim wrap 58 of the desired trim color while making the base wrap 56 separately or as an inlay by: 22) loading the thread spools 18, 20, and 22 as described above but with the one of the first, second, or third threads 12, 14, and 16 of the desired trim color on a lowermost of the thread spool spindles 150; 23) grabbing the free end 216, 218, or 220 of one of the first, second, or third thread 12, 14, and 16 being used for the trim wrap 58 and pulling it to unwind the first, second, or third thread 12, 14, or 16 from the associated of the thread spools 18, 20, or 22 and hooking it to the distal end 190 of the right constant tension spring 178 (for wrapping from the operator's right to left); 24) pulling the free end 216, 218, or 220 so the right constant tension spring 178 deflects upwardly towards the guide pulley 168 to provide constant thread tension and simultaneously adjusting the spool tension by tightening or loosening the wing nut 166 until the right constant tension spring 178 is under a desired thread tension with the distal end 190 under the guide pulley 168; 25) pulling the free end 216, 218, or 220 of the one of the first, second, and third threads 12, 14, and 16 from the distal end 190 of the right constant tension spring 178 over the top of the rod blank 24; 26) starting the trim wrap 58 like a normal wrap (base wrap 56) and making a desired number of turns of the trim wrap 58; and 27) cutting the first, second, or third thread 12, 14, and 16 of the trim wrap 58.

The operator can make spiral wraps by: 28) loosening the thumb screw 76, rotating the thread support assembly 129 from a normal non-angled winding position to a desired angled winding position for applying the spiral wrap to the rod blank 24, and re-tightening the thumb screw 76; 29) making the spiral wrap by longitudinally moving and rotating the rod blank 24 so the first, second, or third thread 12, 14, and 16 crosses the rod blank 24 at the desired angle; and 30) loosening the thumb screw 76, rotating the thread support assembly 129 back to the normal winding position, and re-tightening the thumb screw 76.

The operator can make simple cross wraps using the first, second, or third threads 12, 14, and 16 of up to three different colors by: 31) setting the thread support assembly 129 at a first desired winding angle for wrapping in a first longitudinal direction along rod blank 24 as explained above for spiral wraps; 32) making a first spiral wrap using one of threads 12, 14, or 16 and securing with tape; 33) setting the thread support assembly 129 at a second desired winding angle for wrapping in a second longitudinal direction along the rod blank 24; 34) making a second spiral wrap using one of threads 12, 14, or 16 and securing with tape; 35) setting the thread support assembly 129 back to the first winding angle; and 36) making a third spiral wrap using one of threads 12, 14, or 16 and securing with tape. The above thread operations can be repeated until a desired number of threads are cross wrapped.

The wrapping device for fishing rods and the method of use of the present invention thus solve the shortcomings of the prior art wrapping devices and methods by: 1) being of relatively simple design, compact design, and light weight so as not to be cumbersome and having a unique rod holding saddle that enables the operator to do wrapping with ease and locks the rod blank to prevent unwrapping of the thread between winding operations without manually fastening it down; 2) allowing smooth adjustable thread spool tension using the thread delivery system for dispensing and guiding the threads; 3) having an adjustable thread carriage for spiral and simple cross wraps; 4) having a support frame designed to allow wrapping at a comfortable sitting or standing position and height for steady thread application; 5) having rod supports that are adjustable to position the line guides for wrapping; 6) having longitudinally adjustable upright supports and a handy rest to allow wrapping of any length and diameter fishing rod as well as tips with ease; 7) having a thread support assembly with a three thread spool capacity to allow three thread wrapping; 8) allowing wrapping by placing the rod blank on the rod supports without affixing to the wrapping device; and 9) having a support frame that is changeable to conveniently allow both left- and right-hand operation.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A wrapping device for placement on an elevated support surface to wind threads dispensed from thread spools onto elongated rod blanks of fishing poles to affix component parts therealong and for decorative purposes, comprising: a wrapping support saddle which includes a support base for placement on the support surface and a pair of rod finishing support uprights mounted thereto in a longitudinally spaced relationship adapted to rotationally support the rod blanks, the rod finishing support uprights having respective rod wrapping saddles to receive and rotationally support the rod blanks during thread winding, the rod finishing support uprights projecting laterally of the support base to place the rod wrapping saddles close to a user at a comfortable wrapping height; and a thread delivery system mounted to said support base adapted for dispensing and guiding the thread under a desired tension onto the rod blanks as gripped in-hand and rotated during a winding operation.

2. The wrapping device according to claim 1, wherein the rod wrapping saddles have respective wrapping areas adapted to rotationally support the rod blanks.

3. The wrapping device according to claim 2, wherein the wrapping areas are defined by respective curved planar wrapping surfaces.

4. The wrapping device according to claim 3, wherein the wrapping surfaces are covered with respective wrapping sheets made of a non-abrasive, slick material that allows free rotation and protects the rod blanks.

5. The wrapping device according to claim 4, wherein the wrapping sheets are made of sheet felt material.

6. The wrapping device according to claim 1, wherein the rod finishing support uprights include respective base members mounted to the support base and respective rod wrapping support arms each having a lower end affixed to respective of said base members extending upwardly therefrom at respective right angles and respective rod wrapping saddles cut in respective upper ends thereof to receive and rotationally support the rod blanks during thread winding.

7. The wrapping device according to claim 6, wherein the base member is of rectangular shape and the rod wrapping support arms are each of parallelogram shape projecting laterally of said support base to place the rod wrapping saddles close to a user at a comfortable wrapping height.

8. The wrapping device according to claim 7, wherein the rod wrapping support arms are disposed at an angle of about forty-five degrees from vertical.

9. The wrapping device according to claim 6, wherein the rod finishing support uprights include respective upright members each having a lower end affixed to respective of the base members extending upwardly therefrom at respective right angles and the rod drying saddles cut in respective upper ends thereof.

10. The wrapping device according to claim 1, further comprising a steady rest for placement on the support surface adapted to rotationally support the rod blanks to supplement supporting capabilities of the wrapping support saddle during wrapping of rod blanks of longer lengths.

11. The wrapping device according to claim 10, wherein the steady rest includes a base member adapted to engage the support surface and an upright member having a lower end affixed to said base member extending upwardly therefrom at a right angle and a rod wrapping saddle cut in an upper end thereof to receive and rotationally support the rod blanks during thread winding.

12. The wrapping device according to claim 11, wherein the base member and the upright member are each of rectangular shape.

13. The wrapping device according to claim 1, wherein the wrapping support saddle is primarily made from a material chosen from the group consisting of coated wood and plastic.

14. A wrapping device for placement on an elevated support surface to wind threads dispensed from thread spools onto elongated rod blanks of fishing, comprising: a wrapping support saddle which includes a support base for placement on the support surface and a pair of rod finishing support uprights mounted thereto in a longitudinally spaced relationship adapted to rotationally support a rod blank, the rod finishing support luprights having respective rod wrapping saddles to receive and rotationally support the rod blank during thread winding, at least one of the rod finishing support uprights having means for automatically gripping the rod blank when released from rotation by hand for braking and to prevent unwrapping of the thread, the rod wrapping saddles having respective gripping areas for stopping rotation of the rod blank, and a thread delivery system mounted to said support base for dispensing and guiding the thread under a desired tension onto the rod blank as rotated by hand during a winding operation, the thread delivery system including means for biasing the rod blank toward the gripping areas to assist in braking and to prevent unwrapping when the rod blank is released from rotation by hand.

15. The wrapping device according to claim 14, wherein the gripping areas are defined by respective pairs of intersecting planar upper and lower gripping surfaces adapted to wedge the rod blank therebetween.

16. The wrapping device according to claim 15, wherein the upper and lower gripping surfaces are covered with respective gripping sheets made of a non-abrasive, adherent material that stops rotation and protects the rod blanks.

17. The wrapping device according to claim 16, wherein the gripping sheets are made of sheet sponge rubber material.

18. The wrapping device according to claim 14, wherein the rod finishing support uprights have respective rod drying saddles adapted to receive and rotationally support the rod blanks during rotary drying of a protective finish applied to wrapped threads.

19. The wrapping device according to claim 18, wherein the rod finishing support uprights place the rod drying saddles laterally centered on the support base.

20. The wrapping device according to claim 18, wherein the rod drying saddles have respective V-shaped drying areas defined by respective pairs of flat planar angled wrapping surfaces to rotationally support the rod blanks.

21. The wrapping device according to claim 20, wherein the drying areas are covered with respective drying sheets made of a non-abrasive, slick material that allows free rotation and protects the rod blanks.

22. The wrapping device according to claim 21, wherein the drying sheets are made of sheet felt material.

23. The wrapping device according to claim 14, wherein the thread delivery system includes a thread support assembly mounted to the support base adapted for dispensing the threads under the desired tension and at least one of a guide pulley assembly and a thread guide spring assembly mounted to said support base each adapted for guiding the threads from said thread support assembly onto the rod blanks.

24. The wrapping device according to claim 23, wherein the thread support assembly, the guide pulley assembly, and the thread guide spring assembly are each mounted to the wrapping support saddle between the left and right rod finishing support uprights.

25. The wrapping device according to claim 23, wherein the thread support assembly includes at least one spool tensioning device adapted to receive the thread spool to dispense the thread under the desired tension affixed to a thread support base mounted to the support base.

26. The wrapping device according to claim 25, wherein the thread support base includes a base member mounted to the support base and a thread support upright having a lower end affixed to said base member extending upwardly therefrom at a right angle and an upper end to which each spool tensioning device is affixed.

27. The wrapping device according to claim 25, wherein each spool tensioning device includes a thread spool spindle affixed extending outwardly from the thread support base and a thread spool spring adapted to operably frictionally engage said thread spool base and the thread spool, the spool with thread thereon being retained to said spindle using a spool retaining member such that said thread spool spring resists rotation of the thread spool to provide the desired tension for the thread.

28. The wrapping device according to claim 27, wherein the spool tensioning device is adapted to provide adjustment of thread tension to the desired tension.

29. The wrapping device according to claim 23, wherein the guide pulley assembly includes a guide pulley rotatably and slideably mounted on an elongated shaft disposed generally above and parallel to the support base between the thread support assembly and the rod blank as supported by the rod finishing support uprights, said guide pulley being adapted to receive the thread from said thread support assembly and guide the thread onto the rod blank.

30. The wrapping device according to claim 29, wherein opposite ends of the shaft are retained to the rod finishing support uprights.

31. The wrapping device according to claim 14, wherein the thread delivery system includes at least one constant tension spring affixed to the thread delivery system adapted to flex during winding due to direct frictional engagement with the thread sliding therepast after unwinding from a spool to maintain the desired tension on the thread when winding the rod blank and when winding is stopped.

32. The wrapping device according to claim 31, wherein the constant tension spring is of elongated flexible spring wire construction having a body affixed extending from the thread support assembly transverse of the support base with a distal end thereof adapted to receive the thread from said thread delivery system to pull on the thread as the thread slides therepast such that the thread remains under tension when back wrapping the rod blanks by counter rotating the rod blanks relative to the original direction of winding.

33. The wrapping device according to claim 31, wherein there are a plurality of the threads and constant tension springs for winding multiple threads simultaneously and sequentially.

34. The wrapping device according to claim 14, wherein the means for biasing the rod blank of the thread delivery system includes a constant tension spring which is adapted to pull the thread sliding therepast during a winding operation such that the rod blanks are biased toward the respective gripping areas of the rod wrapping saddles.

35. The wrapping device according to claim 34, wherein the distal end of the constant tension spring is disposed generally between a spool mounted to the thread delivery system and the respective gripping areas of the rod wrapping saddles.

36. A wrapping device for placement on an elevated support surface to wind threads dispensed from thread spools onto elongated rod blanks of fishing poles to affix component parts therealong and for decorative purposes, comprising: a wrapping support saddle which includes a support base for placement on the support surface and a pair of rod finishing support uprights mounted thereto in a longitudinally spaced relationship adapted to rotationally support the rod blanks, a thread delivery system mounted to said support base for dispensing and guiding the thread under a desired tension onto a rod blank as rotated by hand during a winding operation, the thread delivery system including a plurality of the spool tensioning devices each with a thread spool spindle disposed in a parallel relationship, each of the plurality of spool tensioning devices having a compression spring disposed about the respective spool spindles which are adjustable to vary compression of the spring and thereby the frictional resistance thereof against each of the respective spools, the distal end of said thread spool spindle of a middlemost of said spool tensioning devices is externally threaded, and the thread delivery system includes a tensioning plate having a plurality of the mounting holes therethrough for respective of said thread spool spindles to receive said distal ends thereof, and having means for simultaneously varying the amount of frictional force applied to each of the thread spools by their respective compression spring for each of the plurality of spool tensioning devices.

37. The wrapping device according to claim 36, wherein the tension plate is of rectangular shape with the plurality of mounting holes linearly disposed therethrough, and wherein a threaded tensioning adjustment nut is provided for adjusting the position of the tensioning plate along the externally threaded distal end of the middlemost threaded spool spindle.

38. The wrapping device according to claim 36, wherein the base member and the upright member are each of rectangular shape.

39. The wrapping device in accordance with claim 36 wherein each of the plurality of spool tensioning devices are adjustable to approximately match the thread tensions of the plurality of spools for winding the rod blank and wherein the tensioning plate is mounted to each of the plurality of thread spool spindles in such a way that repositioning the tension plate along the middlemost of the thread spool spindles causes each of the respective tensions of each of the plurality of tensioning devices to be adjusted a similar amount to maintain approximate match between the tensions on each of the respective threads of each of the respective spools.

40. A wrapping device for placement on an elevated support surface to wind threads dispensed from thread spools onto elongated rod blanks of fishing poles to affix component parts therealong and for decorative purposes, comprising: a wrapping support saddle which includes a support base for placement on the support surface and a pair of rod finishing support uprights mounted thereto in a longitudinally spaced relationship adapted to rotationally support the rod blanks, said rod finishing support uprights having respective rod wrapping saddles to receive and rotationally support the rod blanks during thread winding, at least one of said rod finishing support uprights being adapted to automatically grip the rod blank when released from hand rotation for braking and to prevent unwrapping of the thread, the rod wrapping saddles have respective wrapping areas and gripping areas adapted to rotationally support and to stop rotation of the rod blanks, said wrapping areas being defined by respective curved planar wrapping surfaces covered with respective wrapping sheets made of a non-abrasive, slick material that allows free rotation and protects the rod blanks, and said gripping areas being defined by respective pairs of intersecting planar upper and lower gripping surfaces adapted to wedge the rod blank therebetween covered with respective gripping sheets made of a non-abrasive, adherent material that stops rotation and protects the rod blanks; and a thread delivery system mounted to said support base adapted for dispensing and guiding the thread under a desired tension onto the rod blanks as rotated by hand during a winding operation, said thread delivery system including a thread support assembly mounted to said support base adapted for dispensing the threads under the desired tension and at least one of a guide pulley assembly and a thread guide spring assembly mounted to said support base each adapted for guiding the threads from said thread support assembly onto the rod blank, said thread support assembly including at least one spool tensioning device adapted to receive the thread spool to dispense the thread under the desired tension and provide adjustment of thread tension affixed to a thread support base mounted to said support base, and said thread guide spring assembly including at least one constant tension spring affixed to said thread support assembly adapted to flex during winding to pull the unwound thread as the thread slides therepast thereby maintaining the desired tension on the thread when winding and when winding is stopped.

41. The wrapping device according to claim 40 wherein the rod finishing support uprights have respective rod drying saddles adapted to receive and rotationally support the rod blanks during rotary drying of a protective finish applied to wrapped threads, said rod drying saddles having respective V-shaped drying areas defined by respective pairs of flat planar angled wrapping surfaces to rotationally support the rod blanks covered with respective drying sheets made of a non-abrasive, slick material that allows free rotation and protects the rod blanks.

42. The wrapping device according to claim 40, further comprising a steady rest for placement on the support surface adapted to rotationally support the rod blanks to supplement supporting capabilities of the wrapping support saddle during wrapping of rod blanks of longer lengths.

43. The wrapping device according to claim 40, wherein there are a plurality of the spool tensioning devices with the thread spool spindles thereof disposed in a parallel relationship, the distal end of said thread spool spindle of at least a middlemost of said spool tensioning devices being externally threaded, the spool retaining member comprising a tensioning adjustment nut that threads thereon adjacent the thread spool, the thread spool spring comprising a compression spring disposed about said thread spool spindle adjacent said retaining nut and the thread spool, the thread tension being adjustable by tightening and loosening said tensioning adjustment nut to vary compression of said spring and frictional resistance thereof against the thread spool, and the thread support assembly including a tensioning plate having a plurality of the mounting holes therethrough for respective of said thread spool spindles to receive said distal ends thereof.

44. The wrapping device according to claim 40, wherein the constant tension spring is of elongated flexible spring wire construction having a looped proximal end affixed to the thread support assembly using a screw and washer, a body extending therefrom transverse of the support base, and a distal end adapted to receive the thread from said thread support assembly and guide the thread onto the rod blank of a configuration chosen from the group consisting of looped and U-shaped to retain the thread sliding therepast, said distal end being disposed generally below the rod blank as supported by the rod finishing support uprights.

45. The wrapping device according to claim 44, wherein there are a plurality of the threads and constant tension springs for winding multiple threads simultaneously and sequentially.

46. The wrapping device according to claim 40, wherein the rod finishing support uprights project laterally of the support base to place the rod wrapping saddles close to a user at a comfortable wrapping height.

47. A method of] winding threads dispensed from thread spools onto an elongated rod blank to affix component parts, comprising the steps of: providing a wrapping device that includes a wrapping support saddle for rotationally supporting the rod blanks and an automatic rotation braking surface to allow the winder a hands free pause during winding, and a thread delivery system for receiving the thread spools wherein the thread delivery system includes at least one constant tension spring that flexes due to direct frictional engagement with the unwound thread as the thread slides therepast during winding to maintain the desired tension on the thread when winding and during a hands free pause, dispensing and guiding the thread under a desired constant tension onto a rod blank when winding and when winding is stopped; placing the rod blank onto the support saddle; securing a starting end of the thread to the rod blank; winding and guiding the thread onto the rod blank at the desired constant tension by freely rotating the blank without manually fastening the rod blank to the support saddle; pausing during hand winding of the thread without maintaining a grip on the rod blank; allowing the automatic rotation braking surface of the wrapping support saddle to stop rotation of the rod blank and maintain the desired constant tension on the thread; securing a finishing end of the thread to the rod blank; and removing the rod blank from the support saddle.

48. The method according to claim 47, wherein the wrapping device provided provides adjustment of thread tension to the desired tension and further comprising the step of adjusting the thread tension to the desired thread tension.

49. The method according to claim 48, wherein the wrapping device provided includes a support base and a pair of rod finishing support uprights mounted thereto in a movable manner and further comprising the step of adjusting at least one of the rod finishing support uprights to accommodate the length of the rod blank.

50. The method according to claim 49, wherein the rod finishing support uprights are mounted to the support base in the movable manner of longitudinally along the support base and the step of adjusting the rod finishing support uprights includes longitudinally adjusting at least one thereof.

51. The method according to claim 49, wherein the rod finishing support uprights are mounted to the support base in the movable manner of pivotally, the step of adjusting the rod finishing support uprights includes pivotally adjusting at least one thereof for a purpose chosen from the group consisting of to move out of the way and to convert the rod wrapping device to opposite-handed operation.

52. The method according to claim 51, wherein the wrapping device provided includes a separate steady rest to rotationally support the rod blank, and the step of placing the rod blank onto the support saddle includes positioning the steady rest and placing the rod blank thereon to supplement supporting capabilities of the wrapping support saddle during wrapping of long rod blanks.

53. The method according to claim 47, wherein the step of winding the thread onto the rod blank is done rotating the rod blank by hand.

54. The method according to claim 47, wherein the wrapping device provided includes a guide pulley rotatably and slideably mounted thereto for guiding the threads from the thread support assembly onto the rod blank and the step of winding the thread onto the rod blank includes guiding the thread using the guide pulley.

55. A wrapping device to wind thread dispensed from a thread spool onto elongated rod blanks of fishing poles, comprising: a pair of rod wrapping supports longitudinally spaced apart and adapted to rotationally support a rod blank, and a thread delivery system having means for dispensing and guiding the thread under a desired constant tension onto the rod blank supported by the pair of rod finishing supports as rotated by hand in both a first, wrapping direction for a winding operation and in a second, counter wrapping direction for back wrapping the rod blank, the pair of rod wrapping supports include at least one gripping area for braking rotation of a partial wound rod blank when released from the winder's grip and wherein the thread delivery system includes means for pulling on the thread sliding therepast during a winding operation such that, when the rod blank is at least partially wound, the rod blank is biased toward the at least one gripping area of the rod wrapping supports such that the rod blank is caused to automatically wedged into the at least one gripping area upon release of the rod blank from the winder's hand.

56. The wrapping device according to claim 55, wherein the thread delivery system includes at least one spool for supplying thread and wherein the thread delivery system includes at least one constant tension spring, which is adapted to flex during winding due to direct frictional engagement with the thread sliding therepast after unwinding from the spool to maintain the desired tension on the thread during both wrapping and counter wrapping of the rod blank and wherein each of the rod wrapping supports includes a gripping area.

57. The wrapping device according to claim 56, wherein the constant tension spring is of elongated flexible spring wire construction having a body extending from the thread delivery system with a distal end thereof adapted to receive the thread from the thread delivery system to pull on the thread as the thread slides therepast such that the thread remains under tension when back wrapping the rod blank by rotating the rod blank in the second, counter wrapping direction to allow correction of winding errors.

58. The wrapping device according to claim 55, wherein at least one of the rod wrapping supports have a wrapping area and a gripping area adapted to stop rotation of the rod blanks, said wrapping area allowing free rotation, and said gripping area being defined by respective pairs of intersecting planar upper and lower gripping surfaces adapted to wedge the rod blank therebetween and being covered with respective gripping sheets made of a non-abrasive, adherent material that stops rotation and protects the rod blank.

59. The wrapping device according to claim 55, wherein the at least one gripping area of the wrapping supports is arranged and the means for pulling on the thread provides sufficient biasing force that the at least one gripping area will automatic brake a partially wound blank to prevent uncontrolled unwrapping of the partially wound blank during a hands free pause such that the blank can be hand wound under constant spring tension without first manually fastening the rod blank to the wrapping supports.

60. The wrapping device according to claim 56, wherein the distal end of the constant tension spring is disposed generally between the spool mounted to the thread delivery system and the at least one gripping area of the rod wrapping supports.

\* \* \* \* \*